United States Patent
Spratte

(10) Patent No.: US 7,170,285 B2
(45) Date of Patent: Jan. 30, 2007

(54) BALL AND SOCKET JOINT WITH PIVOTING ANGLE SENSOR FOR DETECTING THE RELATIVE ANGULAR POSITION OF THE JOINT HOUSING AND THE BALL PIVOT

(75) Inventor: Joachim Spratte, Osnabrück (DE)

(73) Assignee: ZF Friedrichshafen AG (DE)

( * ) Notice: Subject to any disclaimer, the term of this patent is extended or adjusted under 35 U.S.C. 154(b) by 0 days.

(21) Appl. No.: 11/256,903

(22) Filed: Oct. 24, 2005

(65) Prior Publication Data

US 2006/0078369 A1    Apr. 13, 2006

Related U.S. Application Data

(63) Continuation of application No. PCT/DE2004/01800, filed on Aug. 11, 2004.

(30) Foreign Application Priority Data

Aug. 21, 2003   (DE) ............................... 103 38 833

(51) Int. Cl.
  *G01B 7/30* (2006.01)
(52) U.S. Cl. .............................. 324/207.25; 324/207.21
(58) Field of Classification Search ............. 324/207.2, 324/207.21, 207.22, 207.25, 207.26
  See application file for complete search history.

(56) References Cited

U.S. PATENT DOCUMENTS 6,472,865 B1   10/2002 Tola et al.

2002/0149565 A1   10/2002 Sako
2004/0067096 A1   4/2004 Ersoy et al.
2004/0100357 A1   5/2004 Kruse

FOREIGN PATENT DOCUMENTS

| DE | 197 33 719 | 4/1999 |
|----|------------|--------|
| DE | 101 10 738 | 11/2002 |
| DE | 101 61 671 | 6/2003 |
| EP | 0 617 260 | 9/1994 |
| WO | WO 03/008819 | 1/2003 |

*Primary Examiner*—Jay M. Patidar
(74) *Attorney, Agent, or Firm*—McGlew & Tuttle, PC

(57) ABSTRACT

A ball and socket joint (1) is provided with a pivoting angle sensor (9) for detecting the relative angular position of the joint housing (4) and the ball pivot (3). The pivoting angle α of the joint ball (2) is detected by a measuring means comprising a magnet (8) and a magnetic field sensor (9). The position and the size of the magnet (8) as well as the position and the size of the recess of the joint ball (2) are selected for each type of ball and socket joint from one series such that when the particular nominal pivoting angle $\alpha_m$ of the ball and socket joint (1) is reached, the angle κ of the magnetic field lines (12) passing through the magnetic field sensor (9) approximately equals a constant $\kappa_m$, which applies to the entire series. As a result, one and the same magnetic field sensor (9) can be used within the entire series of ball and socket joints for a plurality of types and it can be arranged in one and the same sensor housing (7) as well as at one and the same location at the ball and socket joint (1) for a plurality of types. Among other things, considerable cost savings are achieved because of the resulting reduction in the number of parts and the simplification of the design of the series of ball and socket joints.

22 Claims, 7 Drawing Sheets

BALL AND SOCKET JOINT WITH PIVOTING ANGLE SENSOR FOR DETECTING THE RELATIVE ANGULAR POSITION OF THE JOINT HOUSING AND THE BALL PIVOT

CROSS REFERENCE TO RELATED APPLICATION

This is a continuation of and claims the benefit (35 U.S.C. §120 and 365(c)) of copending International Application PCT/DE 2004/001800 of Aug. 11, 2004, which designated inter alia the United States and which claims the priority of German Application DE 103 38 833.8 of Aug. 21, 2003. The entire contents of each application is hereby incorporated by reference in its entirety.

FIELD OF THE INVENTION

The present invention pertains to a ball and socket joint with a pivoting angle sensor for detecting the relative angular position of the joint housing and the ball pivot.

BACKGROUND OF THE INVENTION

Ball and socket joints of the type mentioned in the introduction are used, for example, but by no means exclusively, on the chassis of motor vehicles. Such ball and socket joints with pivoting angle sensor are used, for example, to detect the relative positions of different chassis parts in relation to one another or the relative position of, e.g., the vehicle axle and the vehicle body and measure them for further processing in an electronic system of the vehicle. This is significant in modern motor vehicles, for example, for electronic stability programs, automatic level control or for dynamic headlight leveling of headlight systems.

Both reliable and accurate detection of the angular position of the ball and socket joints with high repeatability and rapid dynamic response of the pivoting angle sensor are of great significance for such systems. Moreover, due to their arrangement in the area of the chassis, ball and socket joints of this class are, however, also exposed to extremely high mechanical loads, for example, due to vibrations, as well as to strong effects of environmental media, such as moisture, sand or de-icing salt. Nevertheless, users require long service life, fail-safe operation and elimination of the need for maintenance along with low costs.

To meet these requirements it has proved to be useful to integrate in such ball and socket joints systems for detecting the pivoting angle which operate in a contactless manner, especially on the basis of magnetic field effects. A permanent magnet is usually associated in this case with the joint ball, and a magnetic field sensor, especially of the magnetoresistive type (MR), is usually associated with the joint housing. An MR sensor changes its output signal as a function of the direction of the magnetic field lines passing through it, which predestines it for use for ball and socket joints with pivoting angle detection.

Such a ball and socket joint is known, for example, from DE 101 10 738 A1. This ball and socket joint has a bar magnet arranged in the joint ball as well as a magnetic field sensor fastened to the joint housing.

Because the arrangement of such ball and socket joints with pivoting angle detection is different practically in each type of vehicle or because of different chassis geometries or as a consequence of the different designs of electronic control systems, such as headlight leveling or electronic stability programs, it is, however, necessary in most cases to design such ball and socket joints in a vehicle-specific or application-specific manner. The reason for this is that to achieve the highest possible accuracy of the angle detection, the entire measuring range of the magnetic field sensor should be utilized. This utilization of the entire measuring range of the magnetic field sensor should, however, be guaranteed independently from the value of the maximum pivoting angle or nominal pivoting angle occurring on the ball and socket joint.

In other words, this means that the combination of the joint ball, the permanent magnet and especially the magnetic field sensor must be dimensioned according to the state of the art specifically and especially practically for each application such that the amount of the change in the magnetic field passing through the magnetic field sensor is precisely such that the largest possible part of the measuring range of the magnetic field sensor is utilized when passing through the nominal pivoting angle of the ball and socket joint.

However, such an application-specific design of all the components of such a ball and socket joint, which determine the angle detection, is complicated and expensive. This applies especially to the adaptation of the placement, size, sensitivity and accommodation in space of the particular magnetic field sensor at the joint housing, which adaptation is necessary in the particular case.

SUMMARY OF THE INVENTION

Against this background, the object of the present invention is to provide a ball and socket joint with pivoting angle detection, in which the drawbacks are overcome, and in which especially the effort needed for the adaptation of the angle detection system can be correspondingly reduced. Shorter development times shall be achieved in this manner, and, moreover, the development, production as well as purchase and stocking costs shall be reduced.

According to the invention, a ball and socket joint has, a pivoting angle sensor for detecting the relative angular position between the joint housing and the ball pivot or the joint ball. To detect the pivoting angle, a combination of a magnet embedded in the joint ball and a magnetic field sensor arranged at the joint housing is used. The ball and socket joint is characterized according to the present invention in that the position and the size of the magnet, as well as the position and the size of the recess receiving the magnet in the joint ball are selected in an application-specific manner for each type of ball and socket joint, even within one series, such that when the nominal pivoting angle $\alpha_m$ of the particular ball and socket joint is reached, the angle κ of the magnetic field lines passing through the magnetic field sensor approximately equals a constant $\kappa_m$ that applies to the entire series.

In other words, this means that the shape, strength and extension of the magnetic field surrounding the magnet and the joint ball are affected according to the present invention solely by means of the corresponding shape of the joint ball and of the ball pivot carrying the joint ball as well as likewise by the corresponding shape and arrangement of the magnet arranged at the joint ball such that the entire available measuring range of the magnetic field sensor is precisely utilized when the nominal pivoting angle of the ball and socket joint is passed through, independently from the type.

This is extremely advantageous, because one and the same magnetic field sensor can be used essentially for a plurality of types, for example, within one series of ball and socket joint, and, moreover, the magnetic field sensor can be arranged in one and the same sensor housing as well as at one and the same location at the ball and socket joint for a plurality of types. It is readily apparent that this results in very substantial cost savings in development, stocking, production and logistics, as well as a considerable reduction of the response times to changed customer requirements.

The constant $\kappa_m$ especially preferably corresponds essentially to the maximum magnetic field angle detectable by the magnetic field sensor. A measured signal with the highest possible resolution and repeatability in terms of the pivoting angle of the ball and socket joint can thus be obtained from the magnetic field sensor.

It is irrelevant for the present invention which principle of magnetic action and which form and arrangement of the combination of the joint ball and the magnet is used as long as the magnetic field sensor can be supplied hereby with the necessary magnetic field change during the pivoting of the ball and socket joint by its nominal angle.

However, a simple bar magnet, whose magnetic axis preferably coincides with the axis of the ball pivot, is preferably used as the magnet according to a preferred embodiment of the present invention. Such an embodiment is especially simple in terms of design as well as inexpensive, and leads, moreover, to a reliable angle detection, which remains unaffected by a possibly occurring rotation of the ball pivot about its own axis during the operation of the ball and socket joint. The magnet is arranged especially preferably in the pole area of the joint ball that is located opposite the ball pivot.

According to another preferred embodiment of the present invention, the magnetic field sensor is arranged in the area of the opening of the joint housing facing away from the ball pivot or in the area of a closing cover located there. The magnetic axis of symmetry of the magnetic field sensor especially preferably coincides now with the axis of symmetry of the joint housing or with the axis of the ball pivot, in the neutral position thereof.

This is advantageous, just as the above-described arrangement of the magnet, in terms of a simple design of the ball and socket joint, as well as for the reliable detection of the pivoting angle, independently from a possible rotation of the ball pivot in the joint housing. The magnetic field sensor is preferably arranged in a plastic element or is embedded in a plastic element. The plastic element can especially assume at the same time the function of the closing cover for the joint housing on the side of the joint housing located opposite the ball pivot, which in turn serves the purpose of simplifying the design and of correspondingly saving costs and of increasing the reliability of the ball and socket joint.

The manner in which the magnet is connected with the joint ball or in which the magnet is embedded in the joint ball is not crucial to the essence of the present invention. The shape of the magnet is also irrelevant for the present invention, as long as the desired distribution of the magnetic field lines can thus be achieved in the area of the magnetic field sensor. However, the magnet is preferably embedded in the joint ball by means of an elastic auxiliary body, which consists of an elastomer or a plastic according to an especially preferred embodiment of the present invention.

Likewise according to a preferred embodiment of the present invention, the magnet has an essentially bar-like cylindrical shape and the auxiliary body embedding the magnet in the recess of the joint ball has an essentially cylindrical ring shape.

In other words, this means that she joint ball receives only an essentially cylindrical recess for connecting the magnet with the joint ball, and the annular auxiliary body, which preferably consists of a plastic, is placed or pressed into the recess, after which the magnet is in turn inserted, pressed or bonded into the recess of the auxiliary body.

According to another embodiment of the present invention, the elastic auxiliary body may, furthermore, also be designed as an essentially annular spring, consisting of a preferably non-ferromagnetic material, and, according to another embodiment, the annular spring may, moreover, be extrusion-coated with a plastic material at least in some areas for receiving the magnet. On the one hand, the magnet can thus be mounted in an especially simple manner, and, on the other hand, an especially vibration-resistant anchoring of the magnet in the joint ball is achieved with an annular spring, especially with an extrusion-coated spring.

The embedding of the magnet in the joint ball by means of an essentially cylindrical ring-shaped or annular auxiliary body or with an essentially annular spring is especially advantageous in that the position and the size of the magnet as well as the position and the size of the recess in the joint ball, on which the shape, the strength and the extension of the magnetic field depend considerably, can thus be optimized in an especially simple manner and, moreover, independently from one another, so that precisely the characteristic magnetic field necessary for the maximum resolution of the pivoting angle sensor will develop.

The present invention will be explained in greater detail below on the basis of drawings, which show only exemplary embodiments. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
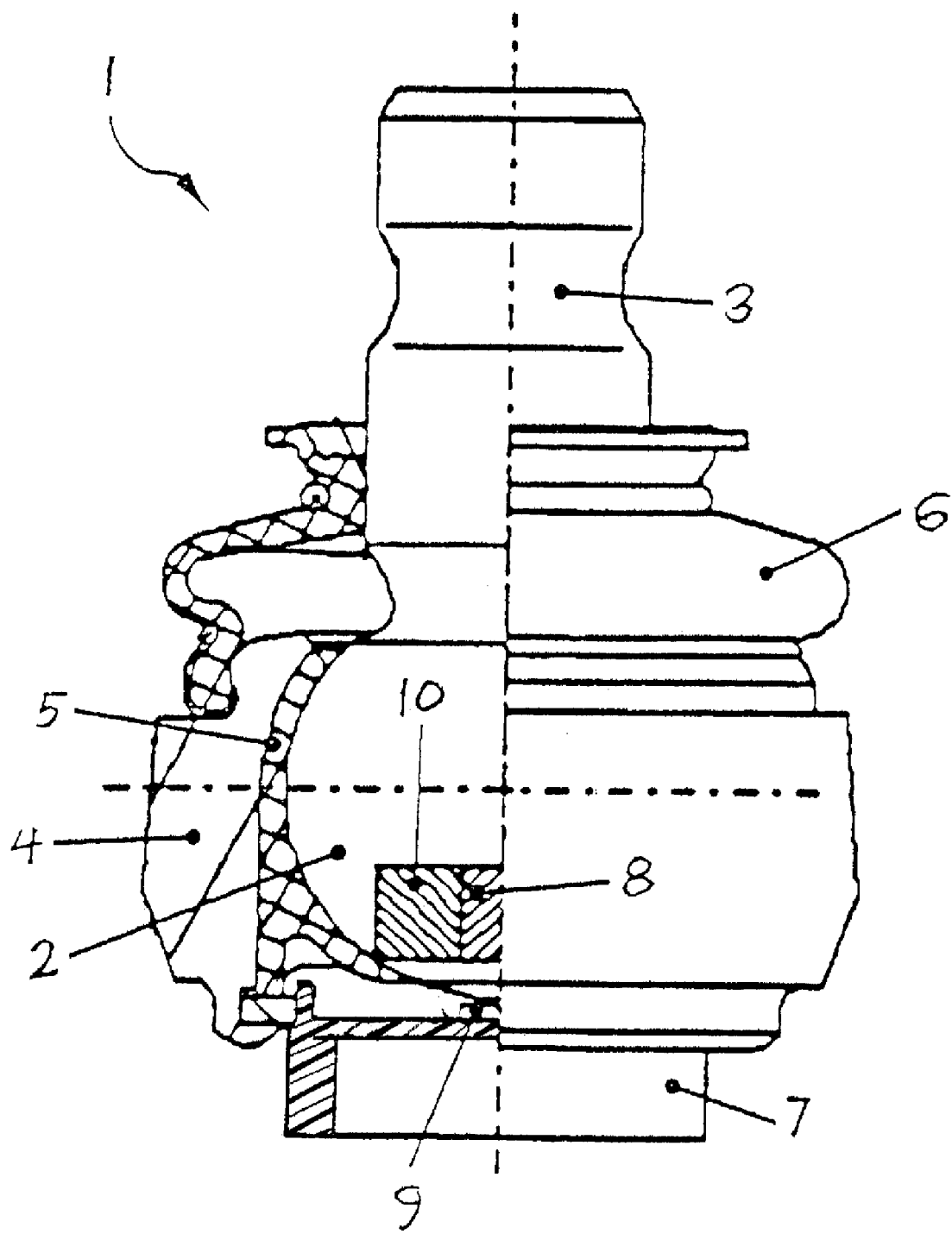
FIG. 1 is a partially cut-away side view of an exemplary embodiment of a ball and socket joint for pivoting angle detection.

Referring to the drawings in particular, FIG. 1 shows a partially longitudinally cut-away view of a ball and socket joint 1. The ball and socket joint 1 is composed essentially of the ball pivot 3 comprising the joint ball 2 and the joint housing 4 with the bearing shell 5 inserted therein. Furthermore, the ball and socket joint 1 also comprises an elastomer bellows 6 and a housing cover 7, which are used to protect the joint ball 2 and the bearing shell 5 against the penetration of dirt and moisture.

Moreover, the ball and socket joint 1 is also provided, however, with a means for detecting the pivoting angle position of the ball pivot 3 in relation to the joint housing 4. This angle measuring means comprises, on the one hand, a permanent magnet 8, which is arranged in the pole area of the joint ball 2, which said pole area faces away from the pivot, in a recess of the joint ball 2 which is present there. On the other hand, the angle measuring means comprises a magnetic field sensor 9, which is arranged on the inner side of the housing cover 7 facing the joint housing 4.

In the exemplary embodiment being shown, the magnetic field sensor 9 is a so-called magnetoresistive sensor (MR sensor), which is characterized in that its output signal is a direct indicator of the angle of the magnetic field lines passing through the sensor.

Furthermore, the plastic ring 10, which is likewise arranged in the pole area of the joint ball 2 in the recess located there and is used to embed the permanent magnet 8 in the joint ball 2, can be recognized in FIG. 1. It already becomes recognizable from this that the characteristic of the magnetic field of the magnet 8 can be changed within broad limits by selecting a magnet 8 of a certain size and strength as well as by the corresponding shape and optionally by selecting the material of the plastic ring 10, without the need to make any further changes of any kind on the ball and socket joint itself.

Besides the magnet 8 itself with its properties that determine the magnetic field, such as the size and the strength of the magnet 8, the plastic ring 10 may also be used itself as a component that actively affects the magnetic field, besides the pure fastening function for fastening the magnet 8 in the joint ball 2. This can happen, for example, by selecting for the plastic ring 10 a material that is not magnetically inert but does affect the course of the magnetic field lines. Moreover, it is also possible to manufacture the magnet 8 from a plastic material, using a magnetizable plastic material to manufacture the magnet 8 in this case. The magnet 8 and the plastic ring 10 may thus even be fused together into a single component, which can be manufactured, for example, by co-extrusion.

Figure 2:
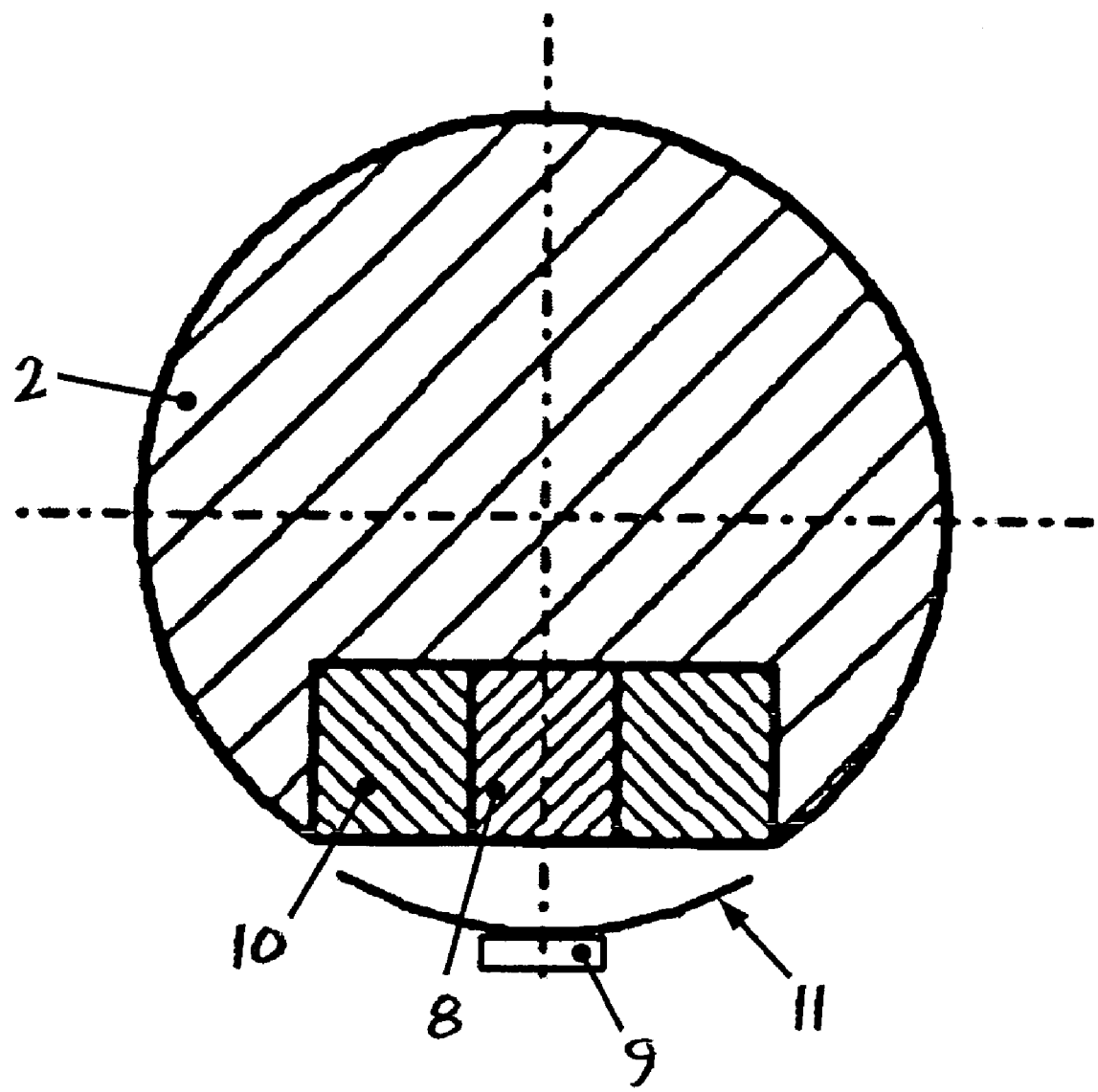
FIG. 2 is a schematic view of a longitudinal section through the joint ball and the magnet of the ball and socket joint according to FIG. 1.

FIG. 2 shows once again only the joint ball 2 of the ball and socket joint 1 according to FIG. 1 for the sake of greater clarity. The plastic ring 10 arranged in the lower pole area of the joint ball 2 relative to the drawing in a cylindrical recess present there and the permanent magnet 8 embedded centrally in the plastic ring 10, as well as the magnetic field sensor 9 can be recognized. During the pivoting of the joint ball 2 in relation to the joint housing 4, which is not shown here and with which the magnetic field sensor 9 is connected via the housing cover 7, likewise not shown in FIG. 2, the magnetic field sensor 9 migrates in relation to the joint ball 2 along the arc segment 11, and the direction of the field lines of the magnet 8, which pass through the magnetic field sensor 9, changes correspondingly as a function of the pivoting angle of the joint ball 2 and so does the output signal of the magnetic sensor 9.

Figure 3:
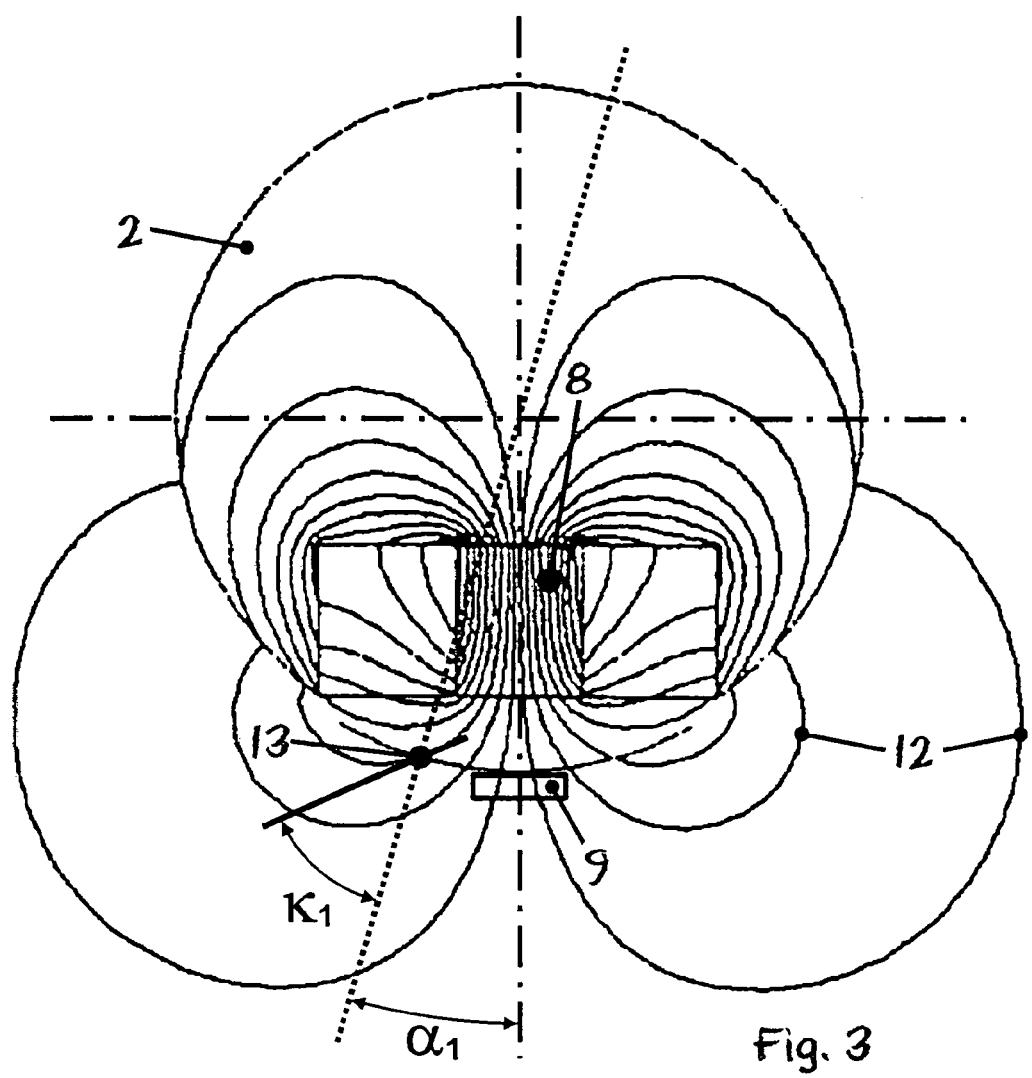
FIG. 3 is a schematic view of a longitudinal section according to FIG. 2 as well as the distribution of the magnetic field lines.

The joint ball 2 and the magnetic field sensor 9 according to FIG. 2 are shown once again in FIG. 3, but this time only schematically. In addition, FIG. 3 shows the distribution of the magnetic field lines 12 of the magnet 8 arranged in the joint ball 2. The angle designated by α describes, for example, the amount of a pivoting of the joint ball 2 in relation to the joint housing 4, whereas κ designates the angle of the magnetic field lines now passing through the magnetic field sensor 9. Relative to the view in FIG. 3, this means that, for example, in case of pivoting of the joint ball 2 by the angle $α_1$, the field lines of the magnet 8 pass through the magnetic field sensor 9 located now at reference number 13 relative to the joint ball 2 at an angle $κ_1$, which leads to an output signal of the magnetic field sensor 9 that corresponds to the angle $κ_1$.

Figure 4:
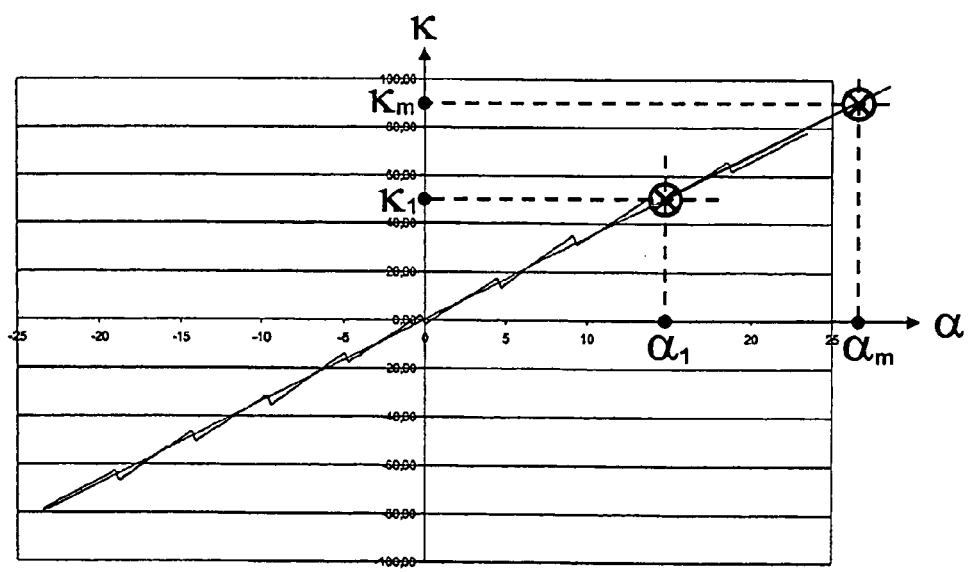
FIG. 4 is a diagram of the curve of the field line angle κ occurring according to FIG. 2, plotted as a function of the pivoting angle α of the joint ball.

In FIG. 4, the angle κ or the corresponding output signal of the magnetic field sensor 9 is plotted as a function of the pivoting angle α of the joint ball 2. The practically linear correlation between the angle signal supplied by the magnetic field sensor 9 and the corresponding pivoting angle of the joint ball 2 can be recognized, which is very useful for the accurate determination of the pivoting angle of the joint ball 2 with the highest possible resolution relative to the joint housing 4.

FIG. 5 shows, again schematically, the joint ball 2 of another ball and socket joint 1 as well as the corresponding distribution of the magnetic field lines 12. However, the joint ball 2 shown in FIG. 5 has, compared to the joint ball according to FIG. 3, a magnet recess with a smaller diameter. The smaller diameter of the magnet recess of the joint ball 2 is compensated according to FIG. 5 by using a plastic ring 10 with a smaller external diameter, the magnet 8 according to FIG. 5 having the same size as the magnet 8 according to FIG. 3. However, even the changed dimensions of the recess of the joint ball 2, which said recess contains the magnet 8 as well as the plastic ring 10, lead already to a considerable change in the shape of the magnetic field and the distribution of the magnetic field lines 12, as can be recognized from a comparison of FIGS. 3 and 5. However, a corresponding change in the response of the magnetic field sensor 9 to pivoting movements of the joint ball 2 in the joint housing 4 is also associated with this.

Figure 5:
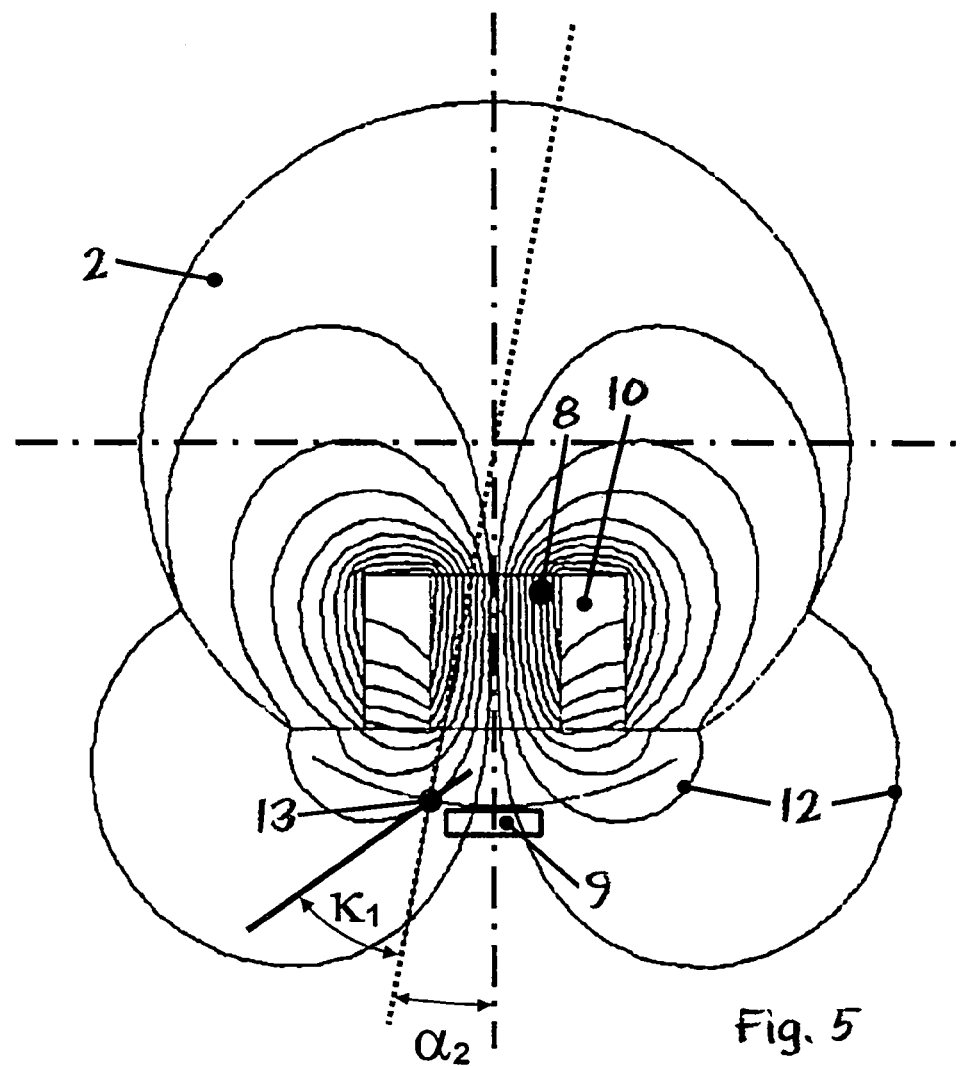
FIG. 5 is a view of the longitudinal section corresponding to FIG. 3 and the field line distribution of the joint ball of another ball and socket joint.

This becomes clear from a comparison of FIG. 5 and FIG. 3. The angle of the magnetic field lines 12 passing through the magnetic field sensor 9 at reference number 13 is designated by $κ_1$ in both FIG. 3 and FIG. 5. The angle $κ_1$ and consequently also the output signal of the magnetic field sensor 9 is equal in both FIG. 3 and FIG. 5. However, due to the different shape of the magnetic field in FIG. 5 compared to that in FIG. 3, the first magnetic field having, in particular, magnetic field lines located more closely to one another, the location 13 or the relative angular position of the joint ball 2 and the joint housing 4, at which the magnetic field lines 12 pass through the magnetic field sensor 9 precisely at the angle $κ_1$, is markedly closer to the neutral or central position of the joint ball 2 in FIG. 5 than in FIG. 3.

In other words, this means that the field line angle $κ_1$, or the corresponding output signal of the magnetic field sensor 9 according to FIG. 5 occurs already at a smaller deflection of the joint ball 2 with a value of $\alpha_2$, whereas the equal field line angle $\kappa_1$ or an equal output signal of the magnetic field sensor 9 appears in the arrangement according to FIG. 3 only at a greater deflection $\alpha_1$ of the joint ball 2.

Figure 6:
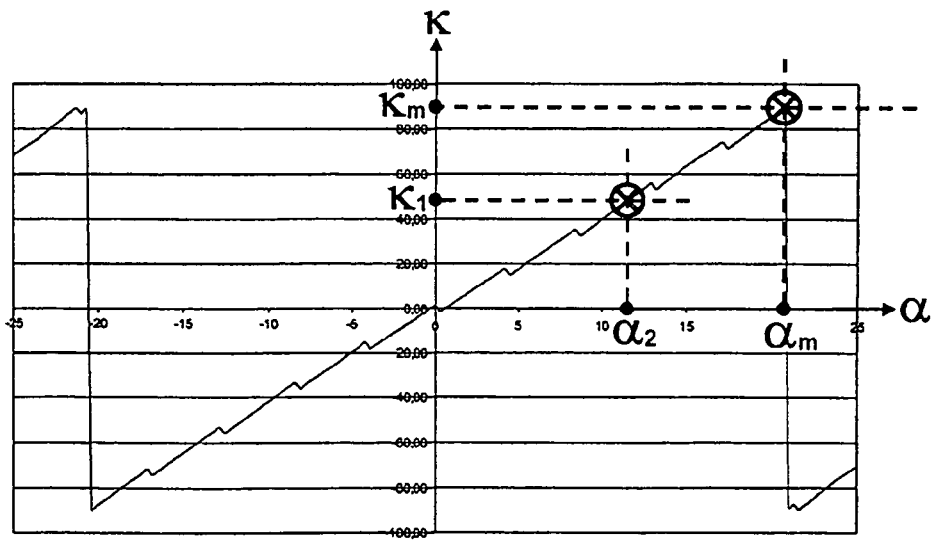
FIG. 6 is a view, corresponding to FIG. 4, of the field line angle κ plotted as a function of the pivoting angle α of the joint ball according to FIG. 5.

This relationship is illustrated once again by a comparison of the diagrams according to FIG. 4 and FIG. 6, where the diagram according to FIG. 4 is associated with the arrangement according to FIG. 3 and the diagram according to FIG. 6 is associated with the arrangement according to FIG. 5. It can be recognized from the comparison of the diagrams in FIGS. 4 and 6 that the output signal $\kappa_1$ is reached only at a pivoting angle of the joint ball 2 of about $\alpha_1=15°$ in the arrangement according to FIG. 3, whereas an equal output signal $\kappa_1$ is reached already in case of a deflection of the joint ball by about $\alpha_2=12°$ in the arrangement according to FIG. 5. Likewise, the maximum output signal $\kappa_m$, which corresponds to a field line angle of about 90° in the embodiment being shown, is reached only on pivoting the joint ball 2 by about $\alpha_m=27°$ in the arrangement according to FIG. 3, whereas the equal maximum output signal $\kappa_m$ is reached already at a deflection of the joint ball by about $\alpha_m=21°$ in the arrangement according to FIG. 5. In other words, this means that a ball and socket joint 1 equipped with a joint ball 2 of the shape according to the present invention as well as with the magnet 8 of the shape according to the present invention and optionally with the plastic ring 10 of the shape according to the present invention can make do with one and the same magnetic field sensor 9 and with one and the same sensor housing 7 for several types within one series of ball and socket joints, and, moreover, the magnetic field sensor 9 can also be arranged at one and the same location in each type of ball and socket joint of the series of ball and socket joints. It is ensured according to the present invention solely by adapting the position and the size of the magnet 8 as well as the position and the size of the recess in the joint ball 2 as well as optionally the size and the design of the plastic ring 10 that the entire available signal width of the magnetic field sensor 9 used in the unchanged form within the entire series is utilized in each ball and socket joint 1 of the series of ball and socket joints during pivoting by the particular nominal pivoting angle of the ball and socket joint 1.

FIGS. 7 through 10 show the joint balls of another two exemplary embodiments of ball and socket joints 1. Besides the longitudinally cut-away joint ball 2 and the magnet 8, an annular auxiliary body 14, which is designed as an essentially annular spring 14 in this embodiment of the ball and socket joint 1, can be recognized in FIG. 7, the annular spring 14 used to anchor the magnet 8 in the cylindrical recess of the joint ball 2 being made preferably of a non-ferromagnetic material in order not to affect or weaken the magnetic field.

Figure 7:
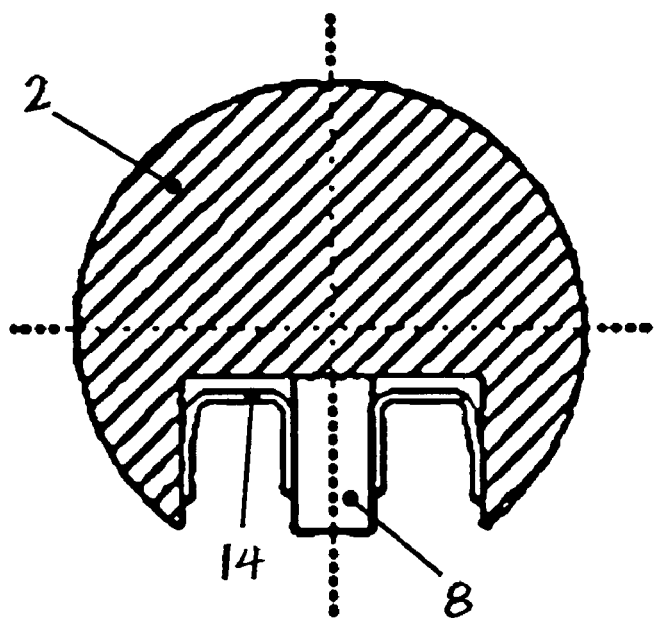
FIG. 7 is a schematic view of the longitudinal section through the joint ball and the magnet of another embodiment of a ball and socket joint.
Figure 8:
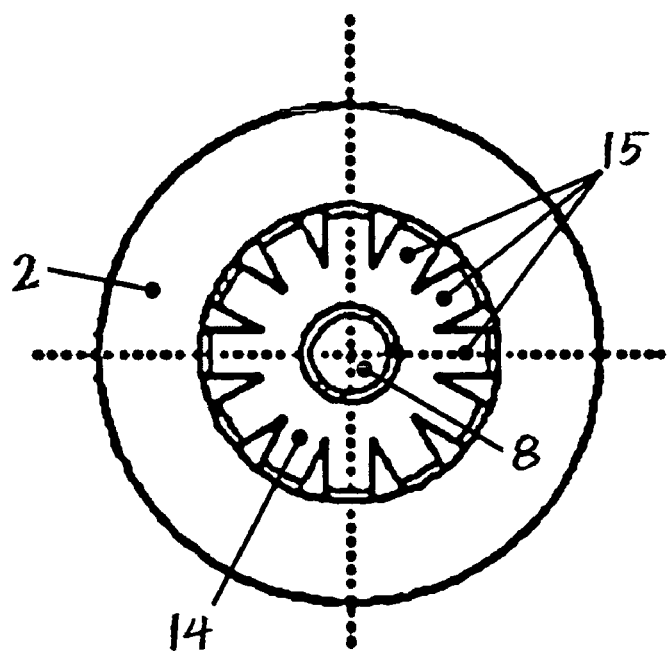
FIG. 8 is a bottom view, corresponding to FIG. 7, of the joint ball according to FIG. 7.

FIG. 8 shows the bottom view of the joint ball 2 according to FIG. 7. Besides the magnet 8 arranged centrally, one can recognize especially the shape of the annular spring 14, which is prepared, for example, by punching, and which is supported on the outer edge of the cylindrical recess of the joint ball 2 with a number of tongue-like spring tabs 15.

Figure 9:
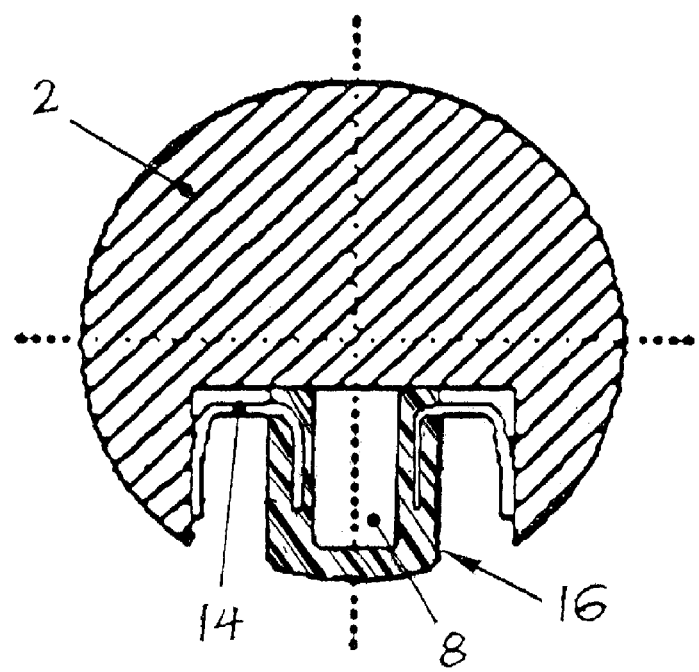
FIG. 9 is a longitudinal sectional view, corresponding to FIGS. 7 and 8, of the joint ball and the magnet of another embodiment of a ball and socket joint.
Figure 10:
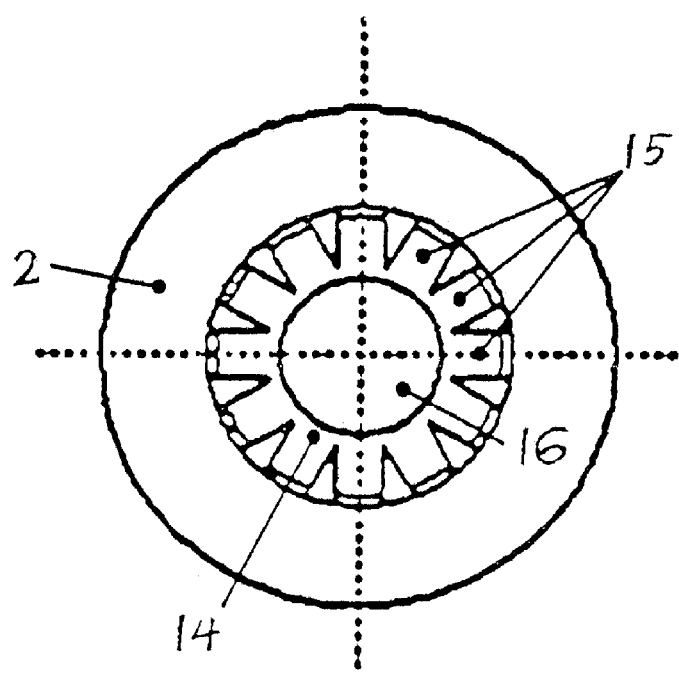
FIG. 10 is a view, corresponding to FIGS. 7 through 9, of the joint ball according to FIG. 9 in a bottom view.

FIG. 9 shows the longitudinal section through a joint ball 2 of another embodiment of a ball and socket joint 1. The joint ball 2 being shown likewise has an essentially annular spring 14 for anchoring the magnet 8 in the cylindrical recess of the joint ball 2. However, the central area of the annular spring 14 receiving the magnet is additionally extrusion-coated with a plastic material 16. This is used to anchor the magnet 8 even better in the cylindrical recess of the joint ball 2, especially against vibrations occurring during the operation of the ball and socket joint 1.

FIG. 10 shows once again the bottom view of the joint ball according to FIG. 9. Besides the annular spring 14, which has, just as the spring according to FIG. 8, a number of spring tabs 15 for supporting the spring 14 in the cylindrical recess of the joint ball 2, the central area of the annular spring 14, which is extrusion-coated with a plastic material 16 and by which the magnet 8 is hidden in this view, can be recognized.

Figure 11:
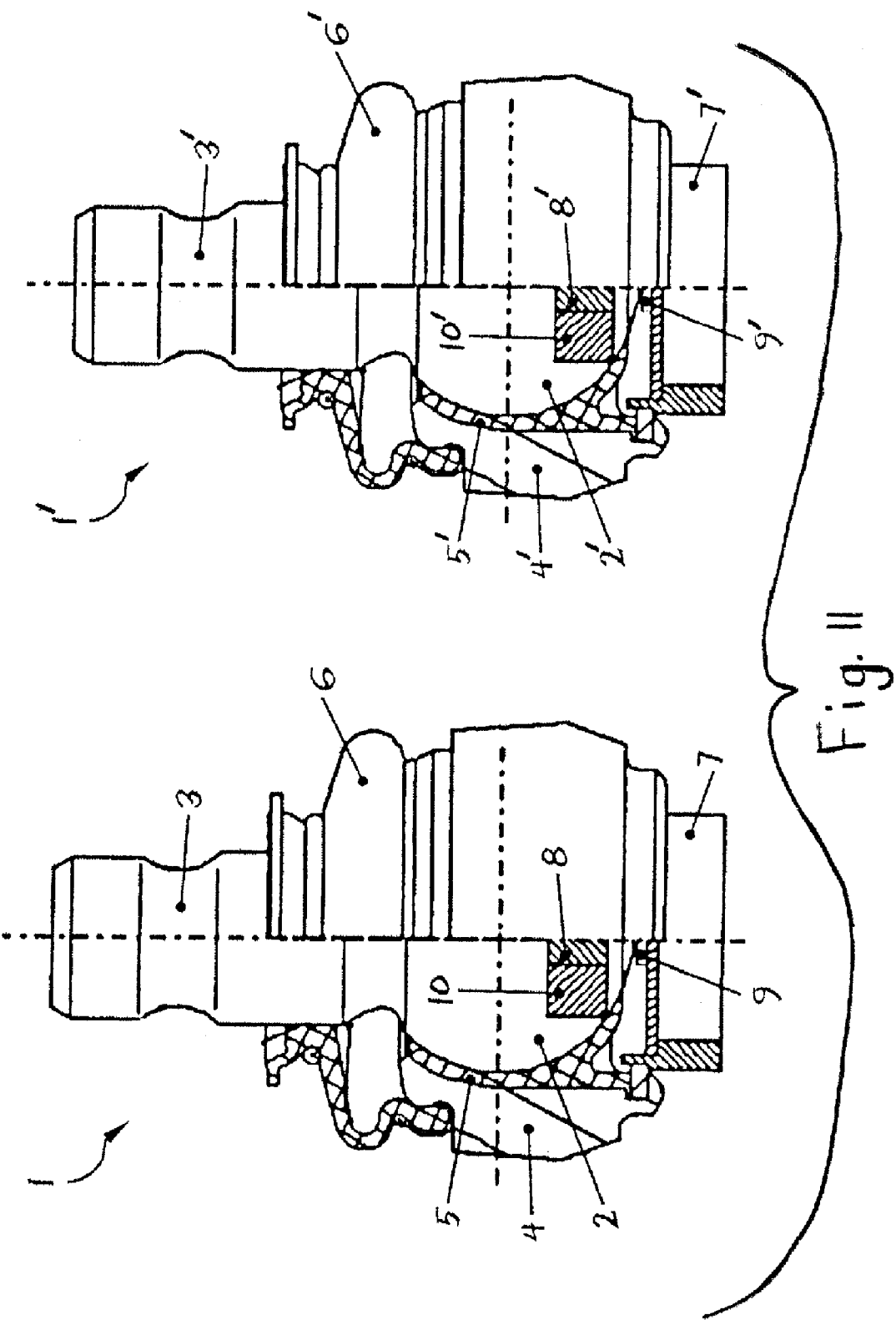
FIG. 11 is a partially cut-away view of an exemplary embodiment of a ball and socket joint for pivoting angle detection in series with another ball and socket joint for pivoting angle detection.

FIG. 11 shows a partially longitudinally cut-away view of a series of ball and socket joints 1 of FIG. 1 in series with another ball and socket joint, 1'.

Thus, it becomes clear as a result that the design effort for dimensioning ball and socket joints for detecting the pivoting angle, and especially the effort for the customer-specific dimensioning and shaping of such ball and socket joints, can be reduced very substantially thanks to the present invention, because the customer-specific redesign of the ball and socket joint can be limited according to the present invention simply to the joint ball and the arrangement of the magnet. The type, design, arrangement and position of the magnetic field sensor each remain, by contrast, unaffected. As a result, it is possible to achieve considerable cost savings, on the one hand, and, on the other hand, the response time to customer-specific wishes and requirements is substantially shortened.

While specific embodiments of the invention have been shown and described in detail to illustrate the application of the principles of the invention, it will be understood that the invention may be embodied otherwise without departing from such principles.

LIST OF REFERENCE NUMBERS

1 Ball and socket joint
2 Joint ball
3 Ball pivot
4 Joint housing
5 Bearing shell
6 Elastomer bellows
7 Housing cover
8 Permanent magnet
9 Magnetic field sensor
10 Plastic ring
11 Arc segment
12 Magnetic field lines
13 Sensor coordinate point
14 Auxiliary body (spring)
15 Spring tab
16 Plastic
$\alpha$ Angle
$\kappa$ Angle

What is claimed is:

1. A ball and socket joint comprising:
a joint housing;
a ball pivot;
a joint ball connected to said ball pivot, said joint ball being mounted in said housing and having and being movable relative to the housing for changing the relative angular position of the joint housing and said ball pivot;
a pivoting angle sensor for detecting the relative angular position of the joint housing and said ball pivot, said pivoting angle sensor including a magnet embedded in a recess of said joint ball and with a magnetic field sensor arranged at said joint housing, said magnet being secured by means of an elastic auxiliary body, said magnet being positioned and having a size and said recess being positioned and having a size in said joint ball such that when a nominal pivoting angle $\alpha_m$ of said ball and socket joint is reached, a magnetic field lines angle $\kappa$ passing through said magnetic field sensor is approximately equal to a constant maximum magnetic field angle($\kappa_m$) detectable by said magnetic field sensor.

2. A ball and socket joint in accordance with claim 1, wherein said magnet is a bar magnet having a magnetic axis coinciding with an axis of said ball pivot.

3. A ball and socket joint in accordance with claim 1, wherein said magnet is arranged at a pole area of said joint ball facing away from the ball pivot.

4. A ball and socket joint in accordance with claim 1, wherein said joint housing includes a closing cover and said sensor is arranged in the area of said closing cover of said joint housing.

5. A ball and socket joint in accordance with claim 1, wherein a magnetic axis of symmetry of said sensor coincides with an axis of symmetry of said joint housing or with an axis of symmetry of said ball pivot.

6. A ball and socket joint in accordance with claim 1, wherein said sensor is arranged or embedded in a plastic element.

7. A ball and socket joint in accordance with claim 6, wherein said plastic element assumes the function of a closing cover for said joint housing.

8. A ball and socket joint in accordance with claim 1, wherein said elastic auxiliary body consists of a polymer.

9. A ball and socket joint in accordance with claim 1, wherein said magnet has an essentially cylindrical shape and said elastic auxiliary body has an essentially cylindrical ring shape.

10. A ball and socket joint in accordance with claim 1, wherein said elastic auxiliary body comprises an essentially annular spring made of a non-ferromagnetic material.

11. A ball and socket joint in accordance with claim 10, wherein said annular spring is extrusion-coated with said plastic material at least in some areas.

12. A series of ball and socket joints, each ball and socketjoint of the series comprising:
a joint housing;
a ball pivot;
a joint ball connected to said ball pivot, said joint ball being mounted in said housing and having and being movable relative to the housing for changing the relative angular position of the joint housing and said ball pivot;
a pivoting angle sensor for detecting the relative angular position of the joint housing and said ball pivot, said pivoting angle sensor including a magnet embedded in a recess of said joint ball and with a magnetic field sensor arranged at said joint housing, said magnet being positioned and having a size and said recess being positioned and having a size in said joint ball such that when a nominal pivoting angle $\alpha_m$ of said ball and socketjoint is reached, a magnetic field lines angle $\kappa$ passing through said magnetic field sensor is approximately equal to a constant $\kappa_m$.

13. A series of ball and socket joints comprising:
a first ball and socket joint of the series including a housing, a joint ball connected to a ball pivot and a pivoting angle sensor for detecting the relative angular position of the joint housing and the ball pivot, the pivoting angle sensor comprising a magnet in a recess of the joint ball and a magnetic field sensor wherein a size of the magnet as well as the position and the size of the recess of the joint ball are selected such that when the particular nominal pivoting angle $\alpha_m$ of the ball and socketjoint is reached, the angle $\kappa$ of the magnetic field lines passing through the magnetic field sensor approximately equals a constant $\kappa_m$;
a second ball and socketjoint of the series including another housing, anotherjoint ball connected to another ball pivot and another pivoting angle sensor for detecting the relative angular position of said anotherjoint housing and said another ball pivot, said another pivoting angle sensor comprising another magnet in a recess of said another joint ball and another magnetic field sensor wherein a size of the another magnet as well as the position and the size of the recess of said another joint ball are selected such that when the particular nominal pivoting angle $\alpha_m$ of the ball and socketjoint is reached, the angle $\kappa$ of the magnetic field lines passing through the another magnetic field sensor approximately equals said constant $\kappa_m$.

14. A ball and socket joint comprising:
a joint housing;
a ball pivot;
a joint ball connected to said ball pivot, said joint ball having a cylindrical recess, said joint ball being mounted in said housing and having and being movable relative to the housing for changing the relative angular position of the joint housing and said ball pivot;
an annular spring comprising a plurality of spring tabs, said annular spring being supported by said plurality of spring tabs and an outer edge of said cylindrical recess of said joint ball; and
a pivoting angle sensor for detecting the relative angular position of the joint housing and said ball pivot, said pivoting angle sensor including a magnet embedded in said cylindrical recess of said joint ball and with a magnetic field sensor arranged at said joint housing, said annular spring securing said magnet in said joint ball, said magnet being centrally arranged in said annular spring, said magnet being positioned and having a size and said recess being positioned and having a size in said joint ball such that when a nominal pivoting angle $\alpha_m$ of said ball and socket joint is reached, a magnetic field lines angle $\kappa$ passing through said magnetic field sensor is approximately equal to a maximum magnetic field angle ($\kappa_m$) detectable by said magnetic field sensor.

15. A ball and socket joint in accordance with claim 14, wherein central area of said annular spring receiving said magnet is coated with a plastic material.

16. A ball and socket joint in accordance with claim 15, wherein said magnet has an end face facing said pivot angle sensor, said end face being covered by said plastic material.

17. A ball and socket joint in accordance with claim 14, wherein said annular spring is made of a non-ferromagnetic material.

18. A ball and socket joint in accordance with claim 14, wherein said annular spring has a U-shaped or double U-shaped design.

19. A ball and socket joint in accordance with claim 14, wherein said spring tabs are spaced from one another at said outer edge of said cylindrical recess of said joint ball.

20. A series of ball and socket joints in accordance with claim 13, wherein the recess in the another joint ball has a smaller diameter than the recess in the joint ball.

21. A series of ball and socket joints in accordance with claim 20, wherein the another magnet has the same size as the magnet.

22. A series of ball and socket joints in accordance with claim 21, wherein:

a plastic ring is arranged in the recess of the joint ball and the magnet is embedded in the plastic ring;

another plastic ring is arranged in the recess of the another joint ball and the another magnet is embedded in the another plastic ring; and the another plastic ring has a smaller external diameter than the plastic ring.

* * * * *